United States Patent [19]
Shoge

[11] Patent Number: 6,083,136
[45] Date of Patent: Jul. 4, 2000

[54] BICYCLE HUB TRANSMISSION WITH A SHIFT KEY THAT IS AXIALLY IMMOVABLE RELATIVE TO A CLUTCH MEMBER

[75] Inventor: Akihiko Shoge, Shimonoseki, Japan

[73] Assignee: Shimano, Inc., Osaka, Japan

[21] Appl. No.: 09/349,837

[22] Filed: Jul. 8, 1999

[30] Foreign Application Priority Data

Aug. 7, 1998 [JP] Japan .................................. 10-224326

[51] Int. Cl.⁷ .................................................. B62M 11/14
[52] U.S. Cl. .............................................................. 475/297
[58] Field of Search ..................................... 475/296, 297

[56] References Cited

U.S. PATENT DOCUMENTS

| | | | |
|---|---|---|---|
| 3,908,807 | 9/1975 | Ozaki et al. | 475/297 |
| 3,937,309 | 2/1976 | Schulz et al. | 192/6 A |
| 4,147,244 | 4/1979 | Segawa et al. | 475/297 |
| 4,240,533 | 12/1980 | Fukui | 192/6 A |
| 4,727,965 | 3/1988 | Zach et al. | 475/297 |
| 5,882,274 | 3/1999 | Shoge | 475/296 |
| 5,928,103 | 7/1999 | Shoge | 475/297 |

OTHER PUBLICATIONS

Shimano Bicycle System Components catalog; pp. 115–116 published Apr. 1982.

*Primary Examiner*—Dirk Wright
*Attorney, Agent, or Firm*—James A. Deland

[57] ABSTRACT

A bicycle hub transmission includes an axle, a driving member rotatably supported on the axle, a slave rotatably supported on the axle, and a power transmitting mechanism disposed between the driving member and the slave for communicating rotational force from the driving member to the slave through a plurality of power transmitting paths. A clutch member is rotatably supported and axially movable on the axle for selecting one of the plurality of power transmitting paths of the power transmitting mechanism, and a shift key is provided for moving the clutch member axially. A shift rod is axially movably supported to the axle for moving the shift key axially, and a biasing mechanism is provided for biasing the clutch member toward the shift key. A link is provided for linking the clutch member to the shift key so that the clutch member is substantially axially immovable relative to the shift key. As a result, the shift key always moves with the clutch member.

20 Claims, 5 Drawing Sheets

BICYCLE HUB TRANSMISSION WITH A SHIFT KEY THAT IS AXIALLY IMMOVABLE RELATIVE TO A CLUTCH MEMBER

BACKGROUND OF THE INVENTION

The present invention is directed to bicycle transmissions and, more particularly, to a bicycle hub transmission that includes a shift key that is axially immovable relative to a clutch member used to shift gears in the transmission.

Three-speed internal shifter hubs are commonly mounted to the rear part of the bicycle frame. Such internal shifter hubs typically comprise a hub axle fixed to the rear part of the bicycle frame, a driver capable of rotating about the hub axle, a hub shell fitted over the driver, a power-transmitting mechanism having three power transmission paths (upshift, downshift, and direct) and comprising a planetary gear mechanism and a plurality of one-way clutches, and a switching mechanism for switching among the power transmission paths of the power-transmitting mechanism.

The driver is provided with a hub cog, and motive power is transmitted to the driver from the chainwheel crank through a chain. The hub shell, which is a cylindrical member having a space in its interior, is provided along the external peripheral portion thereof with hub flanges for attaching the spokes for the rear wheel. The planetary gear mechanism comprises a sun gear formed integrally with the hub axle, a cage rotatably supported around the hub axle, planetary gears rotatably mounted in the cage and meshing with the sun gear, and a ring gear that meshes with the planetary gears. One-way clutches are disposed between the driver and the ring gear, between the ring gear and the hub shell, and between the cage and the hub shell in order to form three power transmission paths. The one-way clutch disposed between the ring gear and the hub shell can be alternated between a linked state and a disengaged state by the switching mechanism, and the other one-way clutches are used solely to transmit one-way rotation (rotation in the direction of travel of the bicycle) from the cage to the hub shell or from the driver to the ring gear.

The switching mechanism, which is rotatably supported and axially movable on the axle, comprises a cylindrical clutch member for selecting one of the three power transmission paths. The central portion of the hub axle is provided with a guide hole extending in the axial direction from one end to the center, and the center of the hub axle at the end portion of the guide hole is provided with a slot extending through the axle in the radial direction. An axially movable shift rod is disposed in the guide hole of the hub axle, and a shift key is mounted in the axle slot for moving the clutch element in response to axial movement of the shift rod. The clutch member can be moved into one of the following three shift positions: an upshift position; a direct-link position; and a downshift position. The clutch member is moved into the various shift positions by pushing the shift rod with a bell crank linked by a shifter cable to a shift lever, twist grip, or other type of shift control device. A first biasing member biases the clutch member toward the upshift position, opposite the pushing direction of the shift rod.

When the clutch member is in the upshift position, the driver and the cage of the planetary gear mechanism are linked to each other by the clutch member. In this state, the cage rotates at the same rotational velocity as the driver, the ring gear is upshifted through the planetary gears, and the motive power of the driver is thereby upshifted and transmitted to the hub shell through through the one-way clutch disposed between the ring gear and the hub shell.

Moving the shift control by one click stop pivots the bell crank which, in turn, pushes the shift rod against the biasing force of the first biasing member, and the shift key moves the clutch member into the direct-link position. When this occurs, the connection between the driver and the cage is released, and the motive power of the driver is directly transmitted to the ring gear through the one-way clutch disposed between the driver and the ring gear. The motive power of the driver then is transmitted directly from the ring gear to the hub shell through the one-way clutch disposed between the ring gear and the hub shell.

Moving the shift control by yet another click stop further pivots the bell crank which, in turn, pushes the shift rod, and the shift key moves the clutch member into the downshift position. When this occurs, the one-way clutch disposed between the ring gear and the hub shell is disengaged by the clutch member, and the motive power of the driver is downshifted by being transmitted from the driver to the ring gear through the one-way clutch disposed between the driver and the ring gear. The motive power of the driver is downshifted through the planetary gears to the cage, and the motive power then is transmitted from the cage to the hub shell through the one-way clutch disposed between the cage and the hub shell.

The shift key is housed inside the clutch member and is allowed to move in the axial direction integrally with the clutch member. The first biasing member, which biases the clutch member toward the upshift position, also biases the clutch member toward the shift key, and a second biasing member is provided for biasing the shift key toward the clutch member so that the shift key follows the clutch member when the clutch member is moved by the shift rod. Thus, the first biasing member and the second biasing member bias the shift key and the clutch member in opposite directions toward each other. When the shift control is moved back to obtain the direct drive or upshifted speeds, the clutch member and the shift key move in the direction toward the cage as a result of the biasing force of the first biasing member.

Sometimes the clutch member disengages from the cage against the biasing force of the first biasing member when the driver rotates in a state of slight meshing between the clutch member and the cage. In such cases, the shift key sometimes disengages from the clutch member without following it when a second biasing member with a light biasing force is used. Disengagement of the shift key from the clutch member creates the risk that the shift key will be tilted and rendered incapable of pushing the clutch member any longer.

The biasing force of the second biasing member can be increased to ensure that the shift key remains with the clutch member and thereby prevent this phenomenon. However, increasing the biasing force of the second biasing member makes it necessary to further increase the biasing force of the first biasing member so that the second biasing member will not override the operation of the first biasing member and inhibit the clutch member from moving toward the cage when the shift rod is released. Unfortunately, increasing the biasing force of the first biasing member also increases the force needed to perform shifting operations. It is therefore preferable for the biasing force of the second biasing member to be minimal.

SUMMARY OF THE INVENTION

The present invention is directed to a bicycle hub transmission of the type described above wherein separation of the shift key from the clutch member is prevented even when a light biasing mechanism is used to bias the shift key toward the clutch member. In one embodiment of the present invention, a bicycle hub transmission includes an axle, a driving member rotatably supported on the axle, a slave rotatably supported on the axle, and a power transmitting mechanism disposed between the driving member and the slave for communicating rotational force from the driving member to the slave through a plurality of power transmitting paths. A clutch member is rotatably supported and axially movable on the axle for selecting one of the plurality of power transmitting paths of the power transmitting mechanism, and a shift key is provided for moving the clutch member axially. A shift rod is axially movably supported to the axle for moving the shift key axially, and a biasing mechanism is provided for biasing the clutch member toward the shift key. A link is provided for linking the clutch member to the shift key so that the clutch member is substantially axially immovable relative to the shift key. As a result, the shift key always moves with the clutch member.

In a more specific embodiment, the clutch member has a tubular shape and includes an inner peripheral surface that defines an interior storage space. The shift key includes opposite end faces disposed within the interior space and facing the inner peripheral surface of the clutch member. The link comprises a ring engaged between the shift key and the clutch member. If desired, the inner peripheral surface of the clutch member may include a clutch member groove, each end face of the shift key may defines a shift key groove, and the ring may be disposed in the clutch member groove and in each shift key groove. The ring thus locks the shift key to the clutch member so that the shift key always moves with the clutch member.

DETAILED DESCRIPTION OF THE EMBODIMENTS

Figure 1:
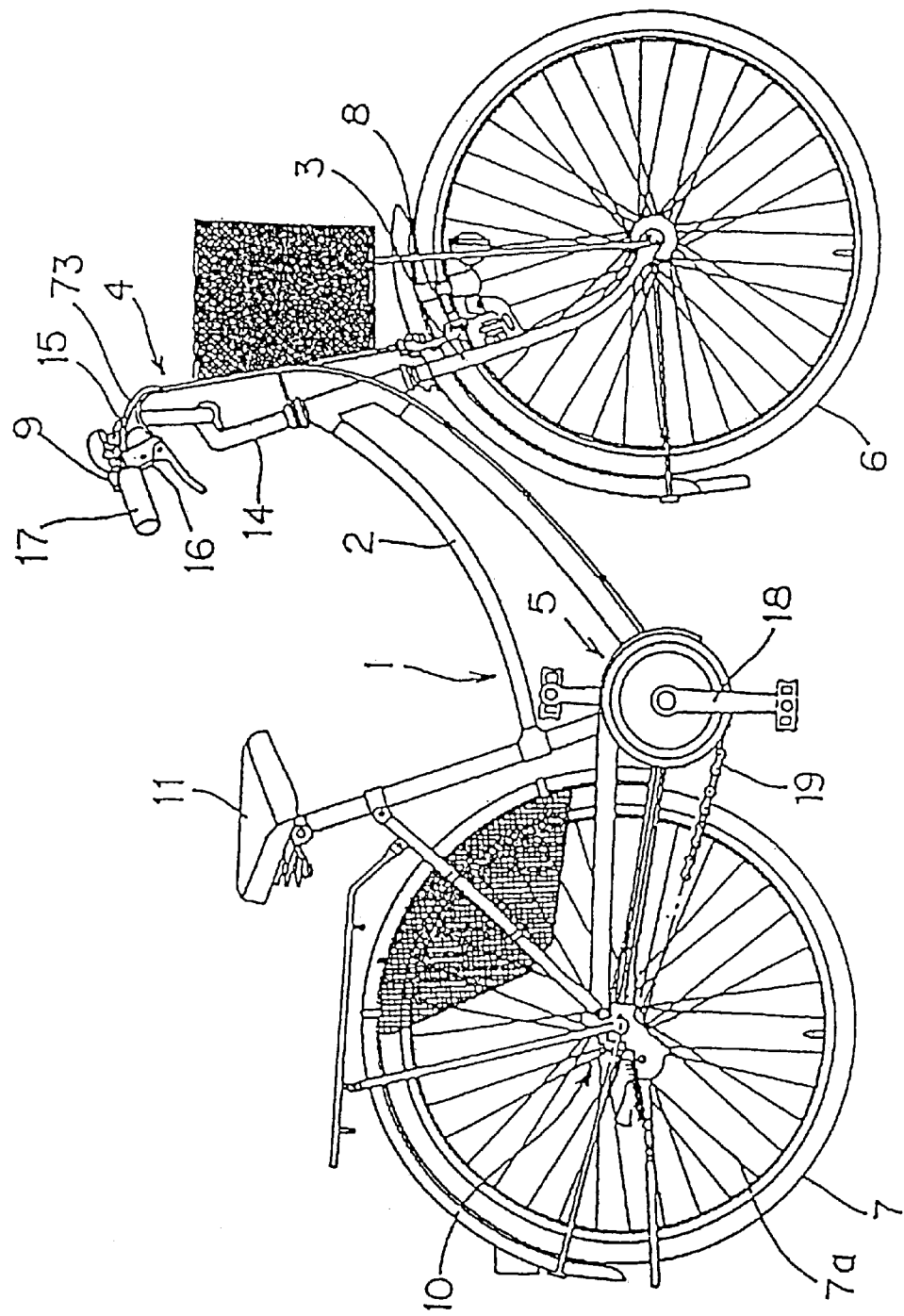
FIG. 1 is a side view of a bicycle that incorporates a particular embodiment of a hub transmission according to the present invention.

FIG. 1 is a side view of a bicycle that incorporates a particular embodiment of a hub transmission according to the present invention. In this embodiment, the bicycle is a recreational bicycle that comprises a frame I having a double-loop-shaped frame body 2 and a front fork 3, a handle component 4, a driver unit 5, a front wheel 6, a rear wheel 7 provided with a three-speed internal shifter hub 10, a front brake device 8, a shift control 9 for the convenient operation of the internal shifter hub 10, and a saddle 11.

The handle component 4 has a handle stem 14 and a handlebar 15, wherein handle stem 14 is fixed to the top of the front fork 3, and handlebar 15 is fixed to the handle stem 14. A brake lever 16, a grip 17, and the shift control 9, which constitute the front brake device 8, are mounted on the right end of the handlebar 15. The shift control 9 is mounted on the handlebar 15 inside the brake lever 16, and it is linked to the internal shifter hub 10 by a shift control cable 73 comprising an inner cable and an outer casing. The shift control 9 has a conventional structure comprising a winding lever for taking up and actuating the inner cable and a release lever for disabling the winding action of the winding lever and paying out the inner cable. A detailed description will therefore be omitted.

The driver unit 5 has a chainwheel 18 mounted in the lower portion (bottom bracket) of the frame body 2. The motive power of the chainwheel 18 is transmitted to the internal shifter hub 10 by a chain 19 wound around the chainwheel 18.

Figure 2:
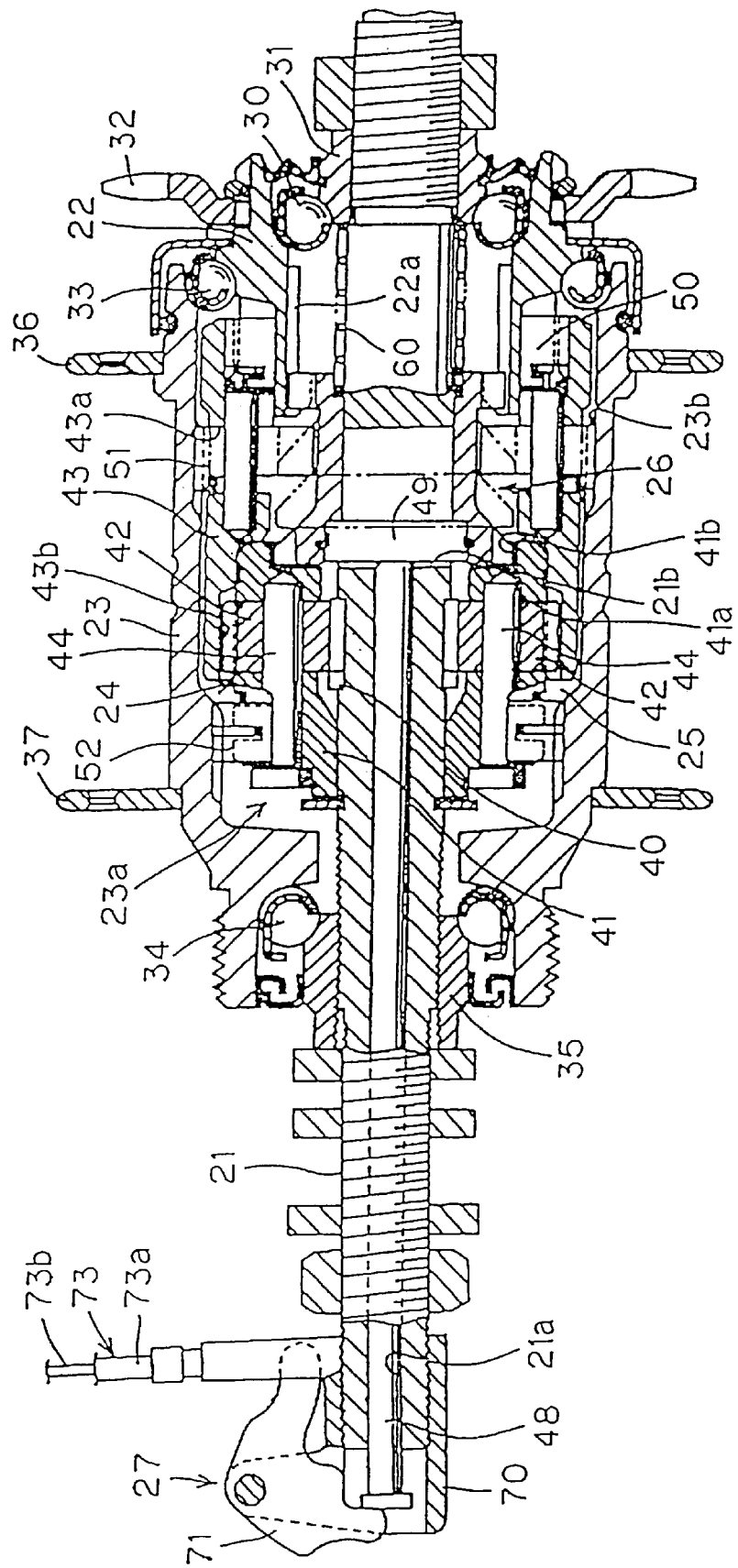
FIG. 2 is a cross-sectional view of the hub transmission shown in FIG. 1.

In this embodiment, the internal shifter hub 10 is a three-speed hub. As shown in FIG. 2, this internal shifter hub 10 comprises a hub axle 21 fixed in the rear forks (not shown) of the bicycle frame 2, a driver 22 fitted over one end of the hub axle 21, a hub shell (a type of slave) 23 that is disposed around the outside of the hub axle 21 and the driver 22, a power-transmitting mechanism 25 containing a planetary gear mechanism 24, a switching mechanism 26 for selecting the power transmission path, and a bell crank 27 for actuating the switching mechanism 26.

The hub axle 21 is a bar-shaped member with a large-diameter central portion, two small-diameter end portions, and threads at both ends. A guide hole 21a extending from the left end to the central portion in FIG. 2 is provided in the central core portion of the hub axle 21. A slot 21b going all the way through the central core of the hub axle 21 is provided along the central core at a prescribed distance. One side of the driver 22 is rotatably supported on the hub axle 21 by balls 30 and a hub cone 31, and a hub cog 32 is fitted over one end. In addition, a plurality of inner serration teeth 22a are formed in the axial direction in the inner peripheral portion of the driver 22 at the other end.

The hub shell 23 is a cylindrical member, and the housing space 23a along the inner peripheral portion thereof accommodates the driver 22 and the power-transmitting mechanism 25. The hub shell 23 can rotate about the hub axle 21 through a hub cone 35 and balls 33 and 34. Hub flanges 36 and 37 for supporting spokes 7a (see FIG. 1) are fixed to both ends of the outer peripheral portion of the hub shell 23.

The power-transmitting mechanism 25 comprises three one-way clutches 50–52 in addition to the planetary gear mechanism 24, and it has the three power transmission paths (upshift, direct, and downshift) as described below.

The planetary gear mechanism 24 comprises a sun gear 40 formed concentrically to and integrally with the hub axle 21, a gear cage 41 fitted over the hub axle 21, four planetary gears 42 (only two planetary gears are shown in the drawing) meshed with the sun gear 40, and a ring gear 43. The gear cage 41 is a cylindrical member rotatably supported by the hub axle 21. The gear cage 41 is provided with four notches 41a in the circumferential direction, and a planetary gear 42 is rotatably supported by a pin 44 in each of the notches 41a. Inner serration teeth 41b are formed in the inner peripheral portion at one end of the gear cage 41.

The ring gear 43 is a cylindrical member extending from the planetary gears 42 to the outer periphery of the driver 22. An inner-tooth gear 43b is formed in the inner peripheral portion at the other end of the ring gear 43. The planetary gears 42 mesh with the sun gear 40 and at the same time with the inner-tooth gear 43b of the ring gear 43 in the manner described above.

The first one-way clutch 50 is mounted between the driver 22 and the ring gear 43. The first one-way clutch 50 is a pawl-type, one-way clutch for transmitting only the rotational motive power of the driver 22 to the ring gear 43 in the direction of travel. The third one-way clutch 52 for transmitting only the motive power of rotation in the direction of travel from the gear cage 41 to the hub shell 23 is disposed between the gear cage 41 and the hub shell 23.

Notches 43a are formed at two facing locations at one end of the ring gear 43, and a clutch pawl 53 (FIG. 4) constituting the second one-way clutch 51 is pivotably supported by a pin 54 in the notches 43a. The clutch pawl 53 is urged in the upright direction (toward the linked state) by a helical torsion spring 55 wound around the outside of the pin 54. When the second one-way clutch 51 is in the linked state, only the motive power of rotation in the direction of travel is transmitted from the ring gear 43 to the hub shell 23. It is only when the ring gear 43 rotates in the direction of travel that the clutch pawl 53 meshes with the ratchet teeth 23b formed on the inner peripheral surface of the hub shell 23. The second one-way clutch 51 can alternate between a disengaged state (in which the clutch pawl 53 is retracted from the ratchet teeth 23b) and a linked state (in which the clutch pawl 53 is caused to mesh with the ratchet teeth 23b by the movement of the below-described clutch member) even when the ring gear 43 is in a state in which rotation can be transmitted in the direction of travel.

The three transmission paths are as follows:

an upshift path comprising driver 22, clutch member 45 (described below), gear cage 41, planetary gear mechanism 24, ring gear 43, Second one-way clutch 51, and hub shell 23;

a direct-link path comprising driver 22, first one-way clutch 50, ring gear 43, second one-way clutch 51, and hub shell 23; and a downshift path comprising driver 22, first one-way clutch 50, ring gear 43, planetary gear mechanism 24, gear cage 41, third one-way clutch 52, and hub shell 23.

Figure 3:
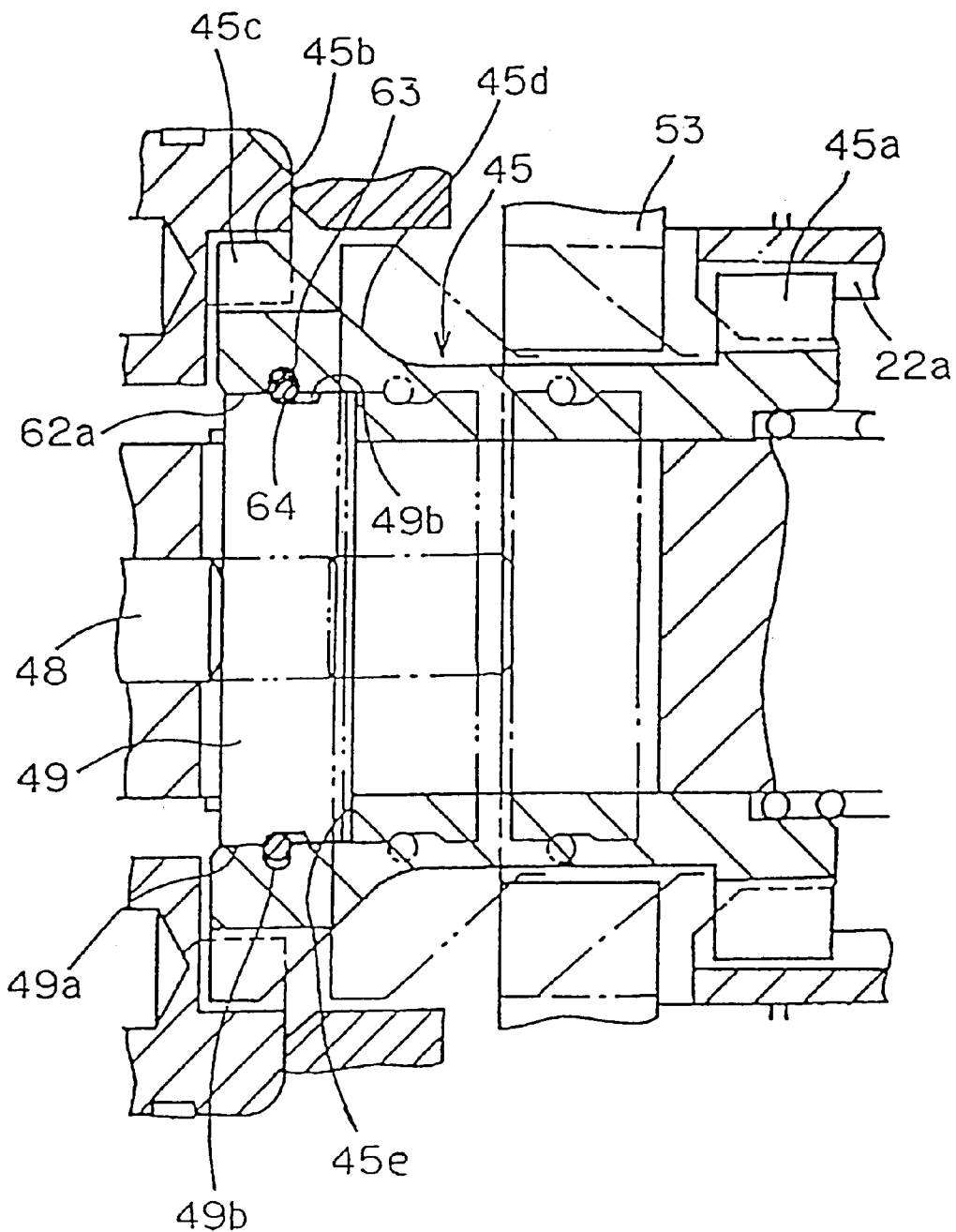
FIG. 3 is a detailed cross-sectional view showing the operation of a the shift key and clutch member according to the present invention.
Figure 4:
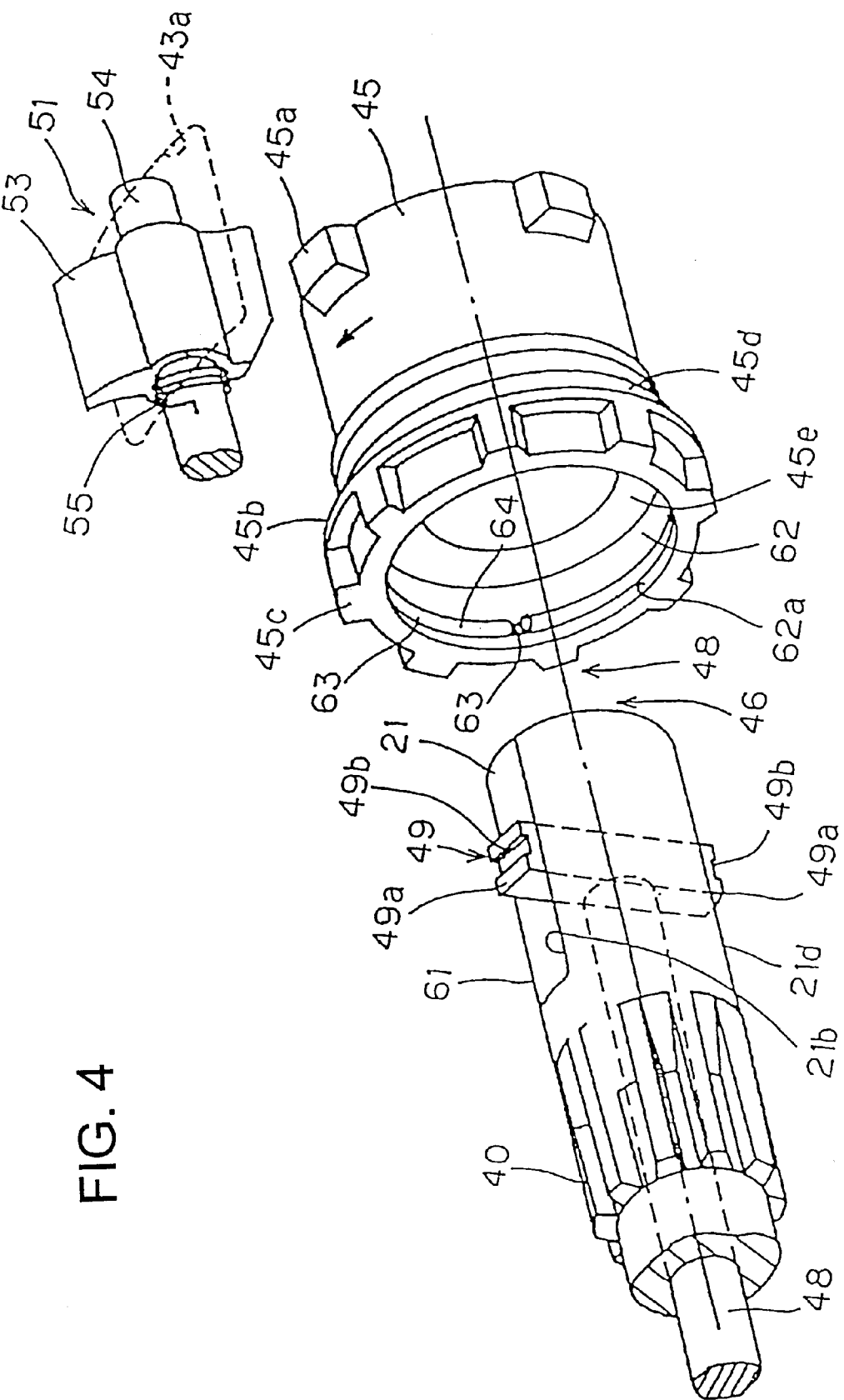
FIG. 4 is a partially exploded view of the clutch actuating mechanism shown in FIG. 2.

As shown more clearly in FIG. 4, the switching mechanism 26, which is designed to select one of the three power transmission paths, comprises a clutch member 45 and a clutch actuator 46. The clutch member 45 switches the driver 22 and the gear cage 41 between a linked state and a disengaged state, and it switches the second one-way clutch 51 between a linked state and a disengaged state. The clutch member 45 is fitted over the hub axle 21 while allowed to move and rotate in the axial direction. The clutch member 45 is a cylindrical member. Outer serration teeth 45a are formed in the outer peripheral portion at one end of clutch member 45, and these outer serration teeth 45a are slidably engaged with the inner serration teeth 22a of the driver 22. A large-diameter portion 45b is formed on the other end of clutch member 45, and outer serration teeth 45c are formed in the outer peripheral portion of large-diameter portion 45b. The outer serration teeth 45c can engage the inner serration teeth 41b formed in the gear cage 41. A tapered surface 45d is formed between the large-diameter portion 45b and one end. This tapered surface 45d is designed to switch the clutch pawl 53 of the second one-way clutch 51 from a linked state (shown by the solid line) into a disengaged state (shown by the broken line in the form of alternate long and two short dashes). When the clutch member 45 moves from the left side toward the downshift position at the right end, the clutch pawl 53 slides along the tapered surface 45d, rises on the large-diameter portion 45b, and assumes the disengaged state. A storage space 62 is formed along the inner periphery of the clutch member 45, and an annular groove 63 is formed in the inner peripheral surface thereof, as shown in FIG. 3. The clutch member 45 is urged toward the gear cage 41 by a coil spring 60.

The clutch actuator 46 is designed to move the clutch member 45 in the axial direction of the hub axle 21. The clutch actuator 46 comprises a shift rod 48 that moves in the axial direction inside the guide hole 21a, and a shift key 49 pushed by the shift rod 48 toward the clutch member 45, as shown in FIG. 3. The shift rod 48 is a bar-shaped member whose length is greater than the distance between the left end of the hub axle 21 and the right end of the slot 21b. The shift key 49 is a member shaped as a square bar moving in the axial direction inside the slot 21b when pushed, as shown in FIG. 3. The shift key 49 is rotatably disposed in the storage space 62 of the clutch member 45 while being prevented from moving in the axial direction. The two ends of the shift key 49 extend in the radial direction from the hub axle 21 and are capable of coming into contact with the stepped portions 45e of the clutch member 45.

A long groove 49b capable of facing the annular groove 63 is formed in the two end faces 49a of the shift key 49 facing the inner peripheral surface 62a of the storage space 62 of the clutch member 45. The long groove 49b and the annular groove 63 accommodate a linkage ring 64, which is confined between the two grooves. The linkage ring 64 is designed to link the shift key 49 with the clutch member 45 in a rotatable and axially immovable fashion. The linkage ring 64 is shaped by bending an elastic wire rod into a circular shape, the two end portions of which are slightly separated from each other. In a free state, the outside diameter of the linkage ring 64 is slightly greater than the inside diameter of the annular groove 63. The linkage ring 64 can therefore expand in the radial direction when mounted in the annular groove 63. In addition, the length (width) of the long groove 49b in the direction of the hub axle is greater than the wire diameter of the linkage ring 64. The reason is to allow the clutch member 45 to rotate smoothly when this clutch member rotates in relation to the shift key 49.

The bell crank 27 is mounted on the left end of the hub axle 21. The bell crank 27 comprises a support bracket 70 mounted on the axle end and a link member 71 pivotably supported by the support bracket 70. The outer casing 73a of the shift control cable 73 is attached to the support bracket 70, and the inner cable 73b is attached to the link member 71. The tip of the link member 71 is pressed against the base end of the shift rod 48. With this arrangement, the link member 71 is pivoted by pulling the inner cable 73b with the aid of the shift control 9, whereupon the shift rod 48 is pushed, the clutch member 45 is pushed by the shift key 49, and a lower speed is selected. On the other hand, loosening the inner cable causes the coil spring 60 to push the clutch member 45, and a higher speed to be selected.

A shifting operation is performed by actuating the shift rod 48 with the bell crank 27 using the shift control cable 73. In the state shown in FIG. 2, in which the shift rod 48 has not been pushed in, the clutch member 45 is disposed in the upshift position at the left end, and the motive power from the driver 22 is upshifted through the upshift path and transmitted to the hub shell 23. In this state, the second one-way clutch 51 is in a linked state, so motive power is transmitted from the driver 22 to the gear cage 41 via the clutch member 45, and the motive power transmitted to the gear cage 41 is further transmitted to the hub shell 23 via the planetary gear mechanism 24, ring gear 43, and second one-way clutch 51. In this case, input rotation is upshifted and output at a speed ratio determined by the number of teeth on the sun gear 40, planetary gears 42, and ring gear 43. When an attempt is made in this case to transmit rotation from the driver 22 in the direction of the ring gear 43 via the first one-way clutch 50, no rotation is transmitted from the first one-way clutch 50 because the ring gear 43 rotates faster than the driver 22.

Actuating the winding lever of the shift control 9 pivots the link member 71 of the bell crank 27 and pushes the shift rod 48 one step inward. As a result, the shift key 49 is pushed by the link member 71 through the shift rod 48 against the spring force of the coil spring 60, and shift key 49 is moved to the right in FIG. 3 while guided along the slot 21b. In the process, the clutch member 45 is also pushed and moved to the right, thus reaching the direct-link position shown by the broken line (alternate long and two short dashes) in FIG. 3, whereby the motive power of the driver 22 is transmitted to the hub shell 23 along the direct-link path. When the clutch member 45 reaches the direct-link position, the gear cage 41 and the driver 22 are no longer linked by the clutch member 45. In this state as well, only the rotation in the direction of travel can be transmitted to the hub shell 23 from the ring gear 43 because the second one-way clutch 51 is in a linked state. More specifically, the rotation that has been input to the driver 22 is transmitted to the ring gear 43 via the first one-way clutch 50 and then to the hub shell 23 via the second one-way clutch 51, and the rotation of the driver 22 is directly transmitted to the hub shell 23 via the ring gear 43. At this time, the rotation is transmitted from the ring gear 43 to the gear cage 41 via the planetary gear mechanism 24, and the gear cage 41 is rotated at a lower speed, but because the hub shell 23 rotates faster than the gear cage 41, there is no transmission of rotation from the gear cage 41 to the hub shell 23 via the third one-way clutch 52.

When the winding lever of the shift control 9 is actuated from its direct-link state and the shift rod 48 is pushed in even further, the shift key 49 moves further to the right, and the clutch member 45 is moved accordingly to the downshift position shown by the dashed line in FIG. 3. As a result, the clutch pawl 53 of the second one-way clutch 51 is swung into the disengaged state by the tapered surface 45d, and the link between the ring gear 43 and the hub shell 23 is released. The motive power from the driver 22 is therefore transmitted to the hub shell 23 along the downshift path. More specifically, the motive power that has been input to the driver 22 is transmitted to the ring gear 43 via the first one-way clutch 50. The rotation transmitted to the ring gear 43 is further transmitted to the hub shell 23 via the planetary gear mechanism 24, gear cage 41, and third one-way clutch 52. In this case, the input rotation is downshifted and output at a speed ratio determined by the number of teeth on the sun gear 40, planetary gears 42, and ring gear 43.

If the release lever is actuated by the shift control 9 in a downshift state, the link member 71 of the bell crank 27 is retracted, the shift key 49 is pushed by the clutch member 45 (which is, in turn, pushed by the coil spring 60), and the shift rod 48 is pushed as well. The clutch member 45 then is brought to a direct-link position. When this happens, the clutch member 45 is separated from the clutch pawl 53 of the second one-way clutch 51, and the clutch pawl 53 is returned to a linked state by the urging force of the helical torsion spring 55. As a result, the motive power of the driver 22 is directly transmitted to the hub shell 23 along the direct-link path described above.

Further operation of the release lever causes the link member 71 of the bell crank 27 to retract even further, the shift key 49 is further pushed by the clutch member 45 (which is, in turn, pushed by the coil spring 60), and the shift rod 48 is pushed as well. The clutch member 45 is moved to the upshift position, meshing is achieved between the outer serration teeth 45c of the clutch member 45 and the inner serration teeth 41b of the gear cage 41, and the driver 22 and the gear cage 41 are linked to each other. The clutch member 45 sometimes disengages from the gear cage 41 when meshing is inadequate during linkage. Even in such cases, the shift key 49 is linked to the clutch member 45 by the linkage ring 64, making it unlikely that the shift key 49 will separate from the clutch member 45.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

Figure 5:
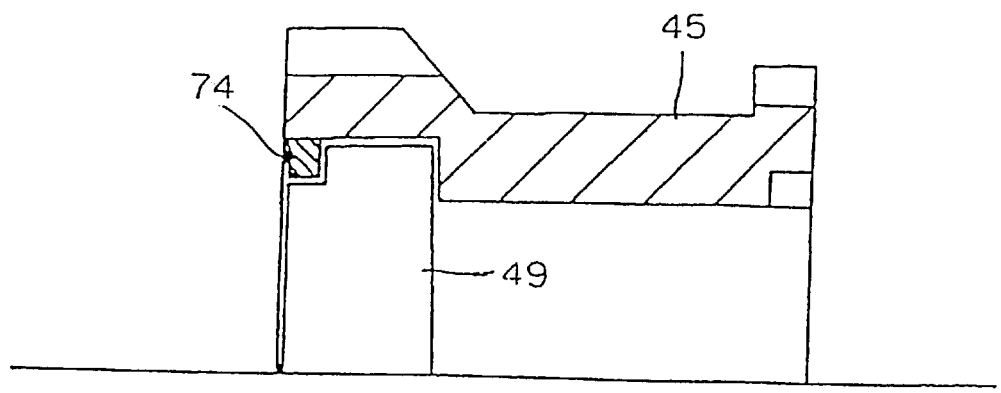
FIG. 5 is a detailed cross-sectional view of an alternative embodiment of a shift key and clutch member according to the present invention.
Figure 6:
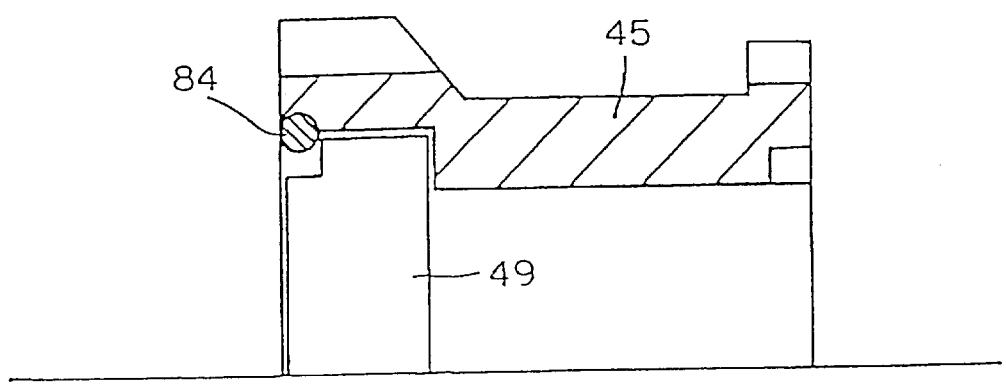
FIG. 6 is a detailed cross-sectional view of another alternative embodiment of a shift key and clutch member according to the present invention.

Although the above embodiment was described with reference to a link member shaped as an elastic linkage ring 64 that had ends, the shape of the link member is not limited to the above-described embodiment and can have any configuration in which the shift key 49 is linked to the clutch member 45 in a rotatable and axially immovable fashion. As shown, for example, in FIG. 5, it is possible to press-fit a ring-shaped link member 74 into the end portion of the inner peripheral surface of the clutch member 45 and to link the shift key 49 in an axially immovable fashion. There is no need in this case to provide the clutch member 45 with an annular groove. Alternately, a groove may be formed in the end portion of the inner peripheral surface of the clutch member 45, and a ring-shaped link member 84 composed of an O-ring or a spring may be mounted therein, as shown in FIG. 6. It is also possible to form the link member as a C-type retaining ring, an E-type retaining ring, or another type of snap ring.

Although the above-described embodiment pertained to a case in which a shift key 49 was housed in a clutch member 45, there is no need for the shift key to be housed in the clutch member as long as this key can be pressed against the clutch member.

Although the above embodiment was described with reference to an internal shifter hub in which a shift rod 48 was inserted through the left end of the hub axle 21, the present invention is also applicable to an internal shifter hub in which the shift rod 48 is inserted through the right end.

Thus, the scope of the invention should not be limited by the specific structures disclosed or the apparent initial focus on a particular structure or feature.

What is claimed is:

1. A bicycle hub transmission comprising:
   an axle;
   a driving member rotatably supported on the axle;
   a slave rotatably supported on the axle;
   a power transmitting mechanism disposed between the driving member and the slave for communicating rotational force from the driving member to the slave through a plurality of power transmitting paths;
   a clutch member rotatably supported and axially movable on the axle for selecting one of the plurality of power transmitting paths of the power transmitting mechanism;

a shift key for moving the clutch member axially;

a shift rod axially movably supported to the axle for moving the shift key axially;

a biasing mechanism for biasing the clutch member toward the shift key; and a link for linking the clutch member to the shift key so that the clutch member is substantially axially immovable relative to the shift key.

2. The transmission according to claim 1 wherein the axle includes an axially extending guide hole, and wherein the shift rod is disposed in the guide hole.

3. The transmission according to claim 2 wherein the guide hole is centrally disposed in the axle.

4. The transmission according to claim 2 wherein the axle includes a slot extending diametrically through the axle, and wherein the shift key is disposed in the slot and extends radially outwardly from the axle.

5. The transmission according to claim 1 wherein the clutch member defines an interior storage space, and wherein the shift key is disposed within the interior storage space.

6. The transmission according to claim 5 wherein the clutch member has a tubular shape.

7. The transmission according to claim 5 wherein the shift key includes an end face that faces an inner peripheral surface of the clutch member.

8. The transmission according to claim 7 wherein the link comprises a ring engaged between the shift key and the clutch member.

9. The transmission according to claim 8 wherein the inner peripheral surface of the clutch member includes a clutch member groove, wherein the end face of the shift key defines a shift key groove, and wherein the ring is disposed in the clutch member groove and in the shift key groove.

10. The transmission according to claim 9 wherein an axial length of the shift key groove is greater than an axial thickness of the ring.

11. The transmission according to claim 1 wherein the power transmitting mechanism comprises:

a sun gear concentrically disposed around the axle;

a cage rotatably supported around the axle;

a planet gear rotatably supported to the cage and meshing with the sun gear; and a ring gear rotatably supported around the axle and meshing with the planet gear.

12. The transmission according to claim 11 further comprising:

a first one-way transmission for linking the driving member to the ring gear;

a second one-way clutch for linking the ring gear to the slave; and a third one-way clutch for linking the cage to the slave.

13. The transmission according to claim 12 wherein the clutch member moves to an upshift position for linking the driving member to the cage and allowing the second one-way clutch to link the ring gear to the slave, wherein the clutch member moves to a direct-drive position for disengaging the driving member from the cage and allowing the second one-way clutch to link the ring gear to the slave, and wherein the clutch member moves to a downshift position for disengaging the driving member from the cage and disengaging the second one-way clutch to thereby disengage the ring gear from the slave.

14. The transmission according to claim 11 wherein the axle includes a centrally disposed and axially extending guide hole that communicates with a slot that extends diametrically through the axle and forms openings on opposite radial sides of the axle, wherein the shift rod is disposed in the guide hole, and wherein the shift key is disposed in the slot and extends radially outwardly from the opposite radial sides of the axle.

15. The transmission according to claim 14 wherein the clutch member has a tubular shape and includes an inner peripheral surface that defines an interior storage space, and wherein the shift key includes opposite end faces disposed within the interior space and facing the inner peripheral surface of the clutch member.

16. The transmission according to claim 15 wherein the link comprises a ring engaged between the shift key and the clutch member.

17. The transmission according to claim 16 wherein the inner peripheral surface of the clutch member includes a clutch member groove, wherein each end face of the shift key defines a shift key groove, and wherein the ring is disposed in the clutch member groove and in each shift key groove.

18. The transmission according to claim 17 further comprising:

a first one-way transmission for linking the driving member to the ring gear;

a second one-way clutch for linking the ring gear to the slave; and a third one-way clutch for linking the cage to the slave.

19. The transmission according to claim 18 wherein the clutch member moves to an upshift position for linking the driving member to the cage and allowing the second one-way clutch to link the ring gear to the slave, wherein the clutch member moves to a direct-drive position for disengaging the driving member from the cage and allowing the second one-way clutch to link the ring gear to the slave, and wherein the clutch member moves to a downshift position for disengaging the driving member from the cage and disengaging the second one-way clutch to thereby disengage the ring gear from the slave.

20. The transmission according to claim 19 wherein an axial length of each shift key groove is greater than an axial thickness of the ring.

* * * * *